(12) United States Patent
Soane et al.

(10) Patent No.: US 6,872,241 B2
(45) Date of Patent: Mar. 29, 2005

(54) ANTI-PATHOGENIC AIR FILTRATION MEDIA AND AIR HANDLING DEVICES HAVING PROTECTIVE CAPABILITIES AGAINST INFECTIOUS AIRBORNE MIRCOORGANISMS

(75) Inventors: David S. Soane, Piedmont, CA (US); Christopher D. Tagge, San Carlos, CA (US)

(73) Assignee: Innovative Construction and Building Materials, LLC, Emeryville, CA (US)

( * ) Notice: Subject to any disclaimer, the term of this patent is extended or adjusted under 35 U.S.C. 154(b) by 0 days.

(21) Appl. No.: 10/273,609

(22) Filed: Oct. 18, 2002

(65) Prior Publication Data

US 2004/0020367 A1 Feb. 5, 2004

Related U.S. Application Data

(60) Provisional application No. 60/345,137, filed on Oct. 19, 2001.

(51) Int. Cl.$^7$ .............................................. B01D 37/02
(52) U.S. Cl. ..................... 96/226; 55/524; 55/DIG. 25; 95/285; 422/120; 427/244; 442/123
(58) Field of Search ........................ 55/524, 527, 528, 55/385.2, DIG. 5, DIG. 33, DIG. 35; 96/226, 227; 95/285; 210/501, 508, 509; 422/120; 427/244, 372.2; 442/123

(56) References Cited

U.S. PATENT DOCUMENTS

| | | | |
|---|---|---|---|
| 3,017,239 A | 1/1962 | Rodman | |
| 3,116,969 A | 1/1964 | Coleman, Jr. | |
| 3,820,308 A | 6/1974 | Onuki | |
| 4,118,226 A | 10/1978 | Bourassa | |
| 4,374,814 A | * 2/1983 | Gaylord ................... | 423/245.1 |
| 4,534,775 A | 8/1985 | Frazier | |
| 4,604,110 A | 8/1986 | Frazier .......................... | 55/74 |
| 4,608,173 A | * 8/1986 | Watanabe et al. ........ | 210/502.1 |
| 4,892,719 A | * 1/1990 | Gesser ................... | 423/245.1 |
| 5,006,267 A | 4/1991 | Vaughn et al. | |
| 5,061,336 A | 10/1991 | Soane ........................ | 156/245 |
| 5,110,514 A | 5/1992 | Soane ......................... | 264/22 |
| 5,114,632 A | 5/1992 | Soane ......................... | 264/22 |
| 5,240,484 A | 8/1993 | Genovese et al. | |
| 5,278,243 A | 1/1994 | Soane ....................... | 525/288 |
| 5,482,551 A | 1/1996 | Morris et al. ............... | 106/772 |
| 5,492,882 A | 2/1996 | Doughty et al. ............ | 502/417 |
| 5,523,075 A | 6/1996 | Fuerst et al. | |
| 5,545,367 A | 8/1996 | Bae et al. ................... | 264/401 |
| 5,547,576 A | 8/1996 | Onishi et al. .......... | 210/500.37 |
| 5,578,217 A | * 11/1996 | Unger et al. ................ | 210/670 |
| 5,618,622 A | 4/1997 | Gillberg-Laforce et al. | |
| 5,840,245 A | 11/1998 | Coombs et al. | |
| 5,876,489 A | 3/1999 | Kunisaki et al. | |
| 5,888,527 A | 3/1999 | Nashimoto et al. | |
| 5,910,291 A | * 6/1999 | Skalla et al. ................ | 422/171 |
| 5,935,370 A | 8/1999 | Weimer et al. ............. | 156/290 |
| 5,944,878 A | 8/1999 | Lindhe ........................ | 96/132 |
| 5,993,738 A | 11/1999 | Goswani | |
| 6,015,832 A | 1/2000 | Baker et al. ................. | 514/546 |
| 6,176,962 B1 | 1/2001 | Soane et al. ................. | 156/292 |
| 6,209,547 B1 | 4/2001 | Koller et al. ............... | 131/331 |
| 6,228,163 B1 | 5/2001 | Espinoza et al. ........... | 106/778 |
| 6,342,284 B1 | 1/2002 | Yu et al. ....................... | 428/70 |
| 6,379,753 B1 | 4/2002 | Soane et al. | |
| 6,380,336 B1 | 4/2002 | Soane et al. | |
| 6,406,535 B1 | 6/2002 | Shintome ..................... | 106/705 |
| 6,435,184 B1 | 8/2002 | Ho | |
| 2001/0040136 A1 | * 11/2001 | Wei et al. .................... | 210/767 |
| 2002/0045667 A1 | 4/2002 | Baker et al. ................. | 514/642 |
| 2003/0084980 A1 | 5/2003 | Seufert et al. ................ | 156/39 |
| 2003/0154888 A1 | 8/2003 | Yu et al. ...................... | 106/772 |
| 2004/0045481 A1 | 3/2004 | Sethuraman et al. ......... | 106/674 |

FOREIGN PATENT DOCUMENTS

| | | |
|---|---|---|
| EP | 1 174 029 | 1/2002 |
| GB | 815184 | 6/1959 |
| JP | 04-197410 | 7/1992 |
| JP | 09-220416 | 8/1997 |
| JP | 2001-162116 | 6/2001 |
| WO | 00/64264 | 11/2000 |
| WO | 02/058812 | 8/2002 |
| WO | 02/059404 | 8/2002 |
| WO | 02/059413 | 8/2002 |
| WO | WO 2004/02468 | 3/2004 |

OTHER PUBLICATIONS

Messier, U.S. patent application Publication No. 2001/0045398, published Nov. 29, 2001.

Linford et al., U.S. patent application Publication No. 2002/0122890, published Sep. 5, 2002.

M. Dever, et al., "Characterization of melt–blown filters made of polypropylene and polypropylene–antimicrobial blends", *Tappi Journal*, vol. 80, No. 3, pp. 157–168, Mar. 1997.

K,K. Foarde, et al., "Determine the efficacy of Antimicrobial treatments of fibrous air filters", *ASHRAE Trans.*, vol. 107, Part 1, pp. 156–170, 2001.

A. Kanazawa, et al.. "Polymeric Phosphnium Salts as a Novel Class of Cationic Biocides. X. Antibacterial Activity of Filters Incorporating Phosphonium Biocides", *J. Applied Polymer Sci.*, vol. 54, No. 9, pp. 1305–1310, Nov. 28, 1994.

(List continued on next page.)

*Primary Examiner*—Frank M. Lawrence
(74) *Attorney, Agent, or Firm*—Christopher Paradies; Fowler White Boggs Banker, P.A.

(57) ABSTRACT

The present invention provides an anti-pathogenic air filtration medium comprising a fibrous substrate whose fibers are coated with coating comprising a polymer. The coating provides an environment that is destructive to airborne pathogens. In particular, the filter medium can be used in a building air handling system that both filters the air and eliminates pathogens. The filter medium also can be used to create a new bio-protective gas mask that not only offers protection against chemical warfare agents, but also provides protection against biological pathogens.

57 Claims, No Drawings

OTHER PUBLICATIONS

M. Okamoto, et al., "Studies on the antibacterial air filter", *Proceedings of the Institute of Environmental Sciences and Technology*, Phoenix, Arizona, Apr. 26–May 1, 1998, pp. 122–128.

Plant Engineering, Mar. 2002, p. 66.

Diebold, J.P., "A Review of the Chemical and Physical Mechanisms of the Storage Stability of Fast Pyrolysis Bio–Oils", *National Renewable Energy Laboratory*, SR–570–27613, Jan. 2000.

Sheldon K. Freidlander, Smoke, Dust and Haze, "Fundamentals of Aerosol Dynamics", Second Edition, Oxford University Press, New York, 2000.

William C. Hinds, Aerosol Technology, "Properties, Behavior, and Measurement of Airborne Particles", A Wiley–Interscience Publication, New York, 1982.

Douglas W. VanOsdell, Benjamin Y.H. Liu, Kenneth L. Rubow, and David Y.H. Pui, Aerosol, Science and Technology, "Experimental Study of Submicrometer and Ultrafine Particle Penetration and Pressure Drop for High Efficiency Filters", 12 : 911–925 (1990).

R.C. Brown, Air Filtration, "An Integrated Approach to the Theory and Applications of Fibrous Filters", Pergamon Press, 1993.

Kvestoslav R. Spurny, Advances in Aerosol Filtration, Lewis Publishers, 1998.

Nancy Runci Bretich, Mary Frances Tracey, Thomas R. Dashiell, Worldwide NBC Mask Handbook, Defense Technical Information Center, ATTN: DTIC–A1, Contract No. DLA900–86–C–2045, Alexandria, Virginia, Sep. 1992.

W.J. Kowalski, W.P. Bahnfleth, TS Whittam, "Filtration of Airborne Microorganisms: Modeling and Prediction," *ASHRAE Transactions: Research*, 105 (2), 4–17, 1999. Accessed online at http://www.arche.psu.edu/iec/abe/fom.html.

Y.–C. Yang, J.A. Baker, and J.R. Ward, "Decontamination of Chemical Warfare Agents." *Chem. Rev.*, 92, (1992), 1729–1743.

K.J. Ewing, P.L. Scolla, J.L. Stricker, and L.A. Citta, "Determination of Optimum Sorbent Material for Collection and Air Desorption of Chemical Warfare Agents." CBIAC No.: CB–160853 (1999).

T.–F. Lin and W.W. Nazaroff, "Transport and Sorption of Water Vapor in Activated Carbon," *J. Envir. Eng.*, (1996), 176–182.

T.–F. Lin, J.C. Little, and W.W. Nazaroff, "Transport and Sorption of Organic Gases in Activated Carbon." *J. Envir. Eng.*, (Mar. 1996), 169–175.

T.–F. Lin, J.C. Little, and W.W. Nazaroff, "Transport and Sorption of Volatile Organic Compounds and Water Vapor within Dry Soil Grains." *Environ. Sci. Technol.*, 28 (1994), 322–330.

T.–F. Lin, M.D. Van Loy, and W.W. Nazaroff, "Gas–Phase Transport and Sorption of Benzene in Soil." *Environ. Sci. Technol.*, 30 (1996), 2178–2186.

G.C. Morrison and W.W. Nazaroff, "The Rate of Ozone Uptake on Carpet: Mathematical Modeling." *Atmospheric Environment*, 36 (2002), 1749–1756.

J.A. Cano–Ruiz, D. Kong, R.B., Balas, and W.W. Nazaroff, "Removal of Reactive Gases at Indoor Surfaces." *Atmospheric Environment*, 27A (1993), 2039–2050.

J.O. Allen, J.S. Paschkewitz, E.F. Plummer, A.L. Lafleur, A.F. Sarofim, and K.A. Smith, "Adsorption of Semi–Volatile Compounds in Oiled Impaction Substrates: Measurement of Pyrene Adsorption." *Aerosol Sci. Technol.*, 30 (1999), 16–29.

Davis et al., "Evaluation of the Filtration Performance of Biocide Loaded Filter Media," International Nonwovens Journal, vol. 8 (No. 2), 1999 (no page number).

S. Shiratori et al., "Removal of Toxic Gas by Hybrid Chemical Filter Fabricated by the Sequential Adsorption of Polymers," Thin Solid Films, 393 (2001), 243–248.

http://hem.dis.anl.gov/eehen/96/960709.html Creech et al. "Clearing the Air: Filters for Residential Forced–Air Systems" Home Energy Magazine Online Jul./Aug. 1996.

http://www.permatron.com/Comm/ODORFUME.html and http://www.airguard.com/downloads/IAO–440.pdf Permatron's and Airguard's products for odor removal (activated carbon impregnated with potassium permanganate) –other companies sell similar products.

http://www.epa.gov/iaq/pubs/residair.html "Residential Air Cleaning Devices: A Summary of Available Information" (EPA's review of the subject).

http://www.ia.wvu.edu/~magazine/winter98/GermKiller.html "Quest for a Better Germ Killer".

S. L. Regen et al., "Activation through Impregnation. Permanganate–Coated Solid Supports" J. Am. Chem. Soc., 1977, 99, 3837–3838.

P. K. Stoimenov et al. "Metal Oxide Nanoparticles as Bactericidal Agents", Langmuir, 2002, 18, 6679–6686.

F. Gonzaga et al., "The Role of Lipophilicity in Oxidation of Mustard Gas Analogues from Micellar Solutions", Langmuir, 1999, 15, 8328–8331.

Airguard Vari Pure "High Capacity Gas Phase Adsorbers," 2000, 4 pages.

* cited by examiner

ANTI-PATHOGENIC AIR FILTRATION MEDIA AND AIR HANDLING DEVICES HAVING PROTECTIVE CAPABILITIES AGAINST INFECTIOUS AIRBORNE MIRCOORGANISMS

CROSS REFERENCE TO RELATED APPLICATIONS

This application claims the benefit of U.S. provisional application Serial No. 60/345,137, filed on Oct. 19, 2001.

FIELD OF THE INVENTION

The present invention relates to anti-pathogenic air filtration media and to air handling systems and personal devices that use air filters.

BACKGROUND OF THE INVENTION

Modern heating, ventilating and air conditioning ("HVAC") systems recycle a large proportion of conditioned air, resulting in improved energy efficiency. Unfortunately, recycling of the air concentrates pathogens in enclosed areas where people congregate, like homes, office buildings and hospitals. This increases the burden on the immune systems of humans who live and work in such enclosed spaces and increases the risk of contracting an airborne infection.

Air handling equipment is also a refuge for microbes. Air ducts are dark and shielded from ambient UV light that inhibits the growth of many types of bacteria in outdoor environments. Condensation that occurs while the system is in cooling operation provides moisture to support growth of microorganisms. Dust particles deposited on the surfaces of ducts and air filters provide nutrients to microorganisms. Such nutrition is especially plentiful on air filters, which process thousands of cubic feet of dust laden air daily. It is now recognized that particulate filters for HVAC systems are propagators of airborne bacteria and are at least partly responsible for transmission of tuberculosis, Legionnaires disease and narcosomal infections in health care facilities. The development of High Efficiency Particulate Air ("HEPA") air filters has not obviated the problem. HEPA filters are able to trap smaller particles than conventional filters, like some airborne microorganisms, and to hold them but they do not capture all airborne microorganisms and are not equipped to kill the microorganisms that they capture. Effort has been expended to develop HVAC systems with a reduced tendency to propagate microorganisms, with considerable emphasis being placed on the development of effective, long-lasting antimicrobial air filters.

U.S. Pat. No. 3,017,329, which issued in 1962, describes a germicidal and fungicidal filter that is said to decrease the likelihood that objectionable odors or viable germs and spores caused by bacteria or fungi colonies will be thrown off the filter. The filter contains a conventional non-woven filter medium with a coating of germicidal and fungicidal active agent applied either by spraying or bathing. The active agent is selected from organo silver compounds and organo tin compounds, which arc pH neutral and highly toxic to mammals. The active agent can be applied to the non-woven fiber during the conventional manufacturing process of a filter wherein the non-woven fiber is immersed in an aqueous bath containing a binder and optionally a fire retardant. Heating of the treated fabric drives off water, cures the binder and, according to the '329 patent, fixes the germicide onto the filter medium.

U.S. Pat. No. 3,116,969 describes a filter having an alkyl aryl quaternary ammonium chloride antiseptic compound that is held onto the filter fibers by a tacky composition that includes a hygroscopic agent, a thickening agent and a film forming agent.

U.S. Pat. No. 3,820,308 describes a sterilizing air filter having a wet oleaginous coating containing a quaternary ammonium salt as the sterilizing agent.

Dever, M. et al, *Tappi Journal* 1997, 80(3), 157, reports the results of a study of the antimicrobial efficacy achieved by incorporating an antimicrobial agent into the fibers of melt blown polypropylene air filters. Three unidentified antimicrobial agents were tested individually. Each agent was blended with polypropylene, which was then melt-blown to form the antimicrobial filter medium. Only two of the antimicrobial agents were detectable in the filter medium by FTIR after processing. The blended filter media were tested against common strains of gram positive and gram negative bacteria. Filter media containing the two detectable agents had antimicrobial properties, but the agents also affected the physical properties of the polypropylene by functioning as nucleating agents. Consequently, the polypropylene blends yielded filters with reduced collection efficiencies and thicker fibers than filters made from unblended polypropylene.

Foard, K. K. & Hanley, J. T., *ASHRAE Trans.* 2001, 107, 156, reports the results of field tests of the antimicrobial efficacy of filters treated with one of three unidentified antimicrobial agents. In field tests where microbial growth was seen on an untreated dust-loaded filter medium, growth also was seen on the treated counterpart. Known antimicrobial filter treatments produced little effect under the conditions in which they arc used.

Kanazawa, A. et al. *J. Applied Polymer Sci.* 1994, 54, 1305 describes an antimicrobial filter medium prepared by covalently immobilizing antimicrobial phosphonium chloride moieties onto a cellulose substrate. The filter was made by reacting a trialkyl-(3-trimethoxysilylpropyl) phosphonium chloride with the hydroxy groups of the cellulose. The investigators found that the chain length of the alkyl groups on phosphorous affected the potency of the filter but not the packing density. According to their measurements, the density of phosphonium chloride in the resulting filter was in excess of that which would be expected for a monolayer, thus indicating that the phosphonium salts were stacked. More lipophilic phosphonium salts, ie. those with longer alkyl chains, tended to have a higher capacity for capturing bacteria.

Okamoto, M. *Proceedings of the Institute of Environmental Sciences and Technology,* 1998, 122, discusses the use of silver zeolite as an antimicrobial agent in an air handling filter. According to the investigators, the silver zeolite was attached by a special binder to one side of the filter.

U.S. Patent Publication No. 2001/0045398 describes a process for the preparation of a non-woven porous material having particles immobilized in the interstices thereof by contacting the material with a suspension of particles of predetermined size and urging the suspension through the material so as to entrain the particles in the interstices of the material. The treated material is said to be useful as an antimicrobial barrier.

According to its English language abstract, International Publication No. WO 00/64264 discloses a bactericidal organic polymeric material for filters which is made of a polymer base comprising a backbone and bonded thereto a polymeric pendant group comprising units derived from an N-alkyl-N-vinylalkylamide and triiodide ions fixed to the polymeric material.

International Publication No. WO 02/058812 describes a filter medium containing timed release microcapsules of an antimicrobial agent. The microcapsules contain the agent suspended in a viscous solvent, which slowly diffuses out of the porous shell of the microcapsule. The microcapsules may be held to the fibrous substrate with an adhesive base such as gum arabic.

Other methods of removing infectious airborne microorganisms have been developed. One method uses a device that draws contaminated air into an enclosed chamber where it is percolated through a liquid so that the microorganisms become encapsulated in the liquid. This device suffers from drawbacks. Intimate mixing of the contaminated air with the liquid must be effected in order for the pathogens to be captured and eliminated. This design is not well suited for the high flow rates of a HVAC system and would be awkward and unwieldy to install and service.

Another method uses electrostatic precipitation to disinfect an airstream containing microorganisms, wherein electrostatic precipitation is combined with photocatalytic oxidation as discussed in U.S. Pat. No. 5,993,738. A system of this type uses electricity to charge the particulate matter in the air stream and an opposing grounded collector plate for collecting the charged particulates, wherein a photocatalyst and UV light destroy pathogens accumulating on the collector plates. The most widely available antimicrobial filter system for commercial or residential use, however, employs an ultraviolet light in combination with a filter. For instance, in U.S. Pat. No. 5,523,075 a filter chamber was described as having a series of UV lamps producing a specific wavelength of UV light to destroy airborne bacteria. One drawback of these filtering systems is that it is energy intensive to power the UV lamp and thus very expensive. Commercial HVACs in e.g., hospitals, use this filtration technology as do some home air purifiers (e.g., Ionic Breeze from Sharper Image).

There remains a need for further improvement in antimicrobial air filters. It is one goal of the present invention to provide an anti-pathogenic air filtration medium for air handling systems like HVACs commonly found in commercial and residential enclosed spaces like homes, hospitals, factories, office buildings and the like. Of course, the filter media of the present invention also find use against microorganisms deliberately introduced into the environment by combatants or terrorists. Gas masks typically offer protection against chemical agents, but not against biological pathogens like anthrax, small pox and the like. The filter media of the present invention are able to provide such protection when incorporated into a replaceable filter cartridge of a gas mask. U.S. Pat. No. 6,435,184, which is hereby incorporated by reference, provides a description of a conventional gas mask structure.

SUMMARY OF THE INVENTION

In one aspect, the present invention provides an anti-pathogenic air filtration medium comprising: a fibrous substrate comprising a plurality of intermingled fibers and surrounding each of a substantial proportion of the plurality of fibers, an anti-pathogenic coating comprising a polymer network. The polymer network may be a randomly cross-linked polymer, a covalently cross-linked linear polymer, a cast mixture of linear polymers cross-linked by ionic or hydrogen bonding interactions, a cross-linked polysiloxane polymer or a hybrid inorganic-organic sol gel material.

The polymer network may be anti-pathogenic in that it contains pendent functional groups or functional groups in the polymer backbone that are disruptive of the biological activity of microorganisms. Such groups include acidic groups, like sulfonic acid groups; quaternary ammonium groups, like alkyl pyridinium groups; and oxidizing functionality, like pyrrolidone-iodine complexes.

In an alternative embodiment, the polymer network is not necessarily anti-pathogenic but, under conditions of use, is capable of forming a gel with a liquid comprising an active agent in at least one non-volatile liquid diluent. Such liquids include solutions of acids, bases and oxidizing agents, metal colloid suspension, surfactant-laden oils and solutions of antimicrobial drugs.

In further aspects, the invention provides processes for fabricating the air filtration media of the invention as well as air filters and cartridges for air filters containing the air filtration media of the invention.

DETAILED DESCRIPTION OF THE INVENTION

The present invention provides an anti-pathogenic air filtration medium. A "pathogen" as that term is used in this disclosure refers to any disease-producing microorganism, including viruses, bacteria, algae, fungi, yeasts, and molds. The anti-pathogenic air filtration medium of this invention disrupts the biological activity of pathogens that become entrained in the filtration medium. The disruption in biological activity may kill the organism or inhibit its propagation.

The air filtration medium of the present invention comprises a fibrous substrate and an anti-pathogenic coating surrounding a substantial proportion of the substrate's fibers. Preferably, the anti-pathogenic coating surrounds not less than 80% of the fibers.

The anti-pathogenic coating comprises a polymer network. The air filtration medium acquires its stable antimicrobial characteristics from the coating and, in some embodiments, from the polymer network of the coating. The anti-pathogenic coating exploits the sensitivity of pathogens to harsh chemical environments, such as conditions of extreme pH and oxidizing conditions. In the past, it has been difficult to impart such properties to the fibrous media used in air filters. Liquid acids and bases, like aqueous solutions of hydrochloric acid, sulfuric acid, and liquid organic amines, are difficult to immobilize on a fibrous substrate.

The same is true for strong liquid oxidizers and strongly solublizing substances like surfactant laden oils. As previously discussed, apparatuses that bubble air through liquids are unwieldy to incorporate and maintain in high volume air handling systems. Solid bases and oxidants like alkali metal and alkaline earth metal hydroxides are difficult to adhere to a fibrous substrate.

The polymer network does not significantly affect the physical properties of the substrate fibers, like tensile strength, elasticity and resistance to deformation.

The fibrous substrate is any porous natural or synthetic material made of intermingled fibers. The fibrous substrate can be woven or non-woven. Exemplary natural materials suitable for use as a fibrous substrate include cotton, wool and cellulose. Exemplary synthetic materials suitable for use as the fibrous substrate include spun polylakylenes such as polypropylene, polyethylene and the like; glass (i.e. fiberglass), polyester, cellulose acetate, polystyrene, vinyl, nylon, rayon, acrylic, acrylonitrile and high performance engineering plastics that can be spun into fibers. Especially preferred synthetic materials for forming the fibrous substrate are commercially available products: Teflon® and Teflaire® (PTFE), SoloFlo® (HDPE), Sontara® and Dacron® (polyester) and Xavan®, all of which are products of DuPont Chemical Co., as well as Airex® (fiberglass and polyester). The preferred fibrous substrates have large surface areas for air contact while causing little air resistance, resulting in a low pressure drop during operation. Techniques for weaving and forming non-woven fibrous mats from natural and synthetic materials arc well known in the art. Fibers of non-woven material may be held together with a binder.

The network polymer can be essentially any polymer that can withstand acidic, basic, oxidizing or strongly solubilizing substances without decomposing. Generally, the network polymer will be either (1) a randomly cross-linked polymer such as is formed by co-polymerization of a monomer with a bi- or multi-functional cross-linking agent, (2) a covalently cross-linked linear polymer, (3) a network formed of a mixture of linear polymers cross-linked by ionic or hydrogen bonding interactions, (4) a cross-linked polysiloxane polymer or (5) a hybrid inorganic-organic sol gel material. Exemplary random cross-linked polymers include cross-linked poly(styrene sulfonic acid) (free acid or salt), cross-linked polyacrylic acid (free acid or salt), poly(vinyl pyridine) quaternary ammonium salts, cross-linked polyethylenimine quaternary ammonium salts and cross-linked poly (hydroxyethylmethacrylate) ("polyHEMA"). Exemplary covalently cross-linked linear polymers include cross-linked carboxymethylcellulose and other cross-linked cellulose ethers (free acid or salt). Exemplary mixtures of linear polymers cross-linked by ionic or hydrogen bonding interactions include mixtures of poly(vinylpyrrolidone) and poly (sodium styrene sulfonate) and mixtures of poly(ethylene glycol) and poly(vinylpyrrolidone) and mixtures of carboxymethyl cellulose and hydroxyethyl cellulose and innately gel-forming polymers such as guar gum, xanthan gum and sodium alginate. Exemplary polysiloxanes include poly(dimethylsiloxane). Exemplary hybrid inorganic-organic materials include networks formed via the sol gel process from mixtures of tetrethoxysilane (TEOS) and bis (triethoxylsilyl)alkanes, such as bis(triethoxysilyl)methane.

Air filtration media of the present invention are provided in two embodiments. The embodiments are differentiated by the way that anti-pathogenic characteristics are imparted to the coating.

In one embodiment, the network polymer is anti-pathogenic. Cross-linked poly(styrenesulfonic acid) (free acid or salt), cross-linked poly(acrylic acid) (free acid or salt), cross-linked poly(methacrylic acid), cross-linked poly (vinyl pyridine) quaternary ammonium salts and cross-linked polyethylenimine quaternary ammonium salts are examples of anti-pathogenic network polymers.

In another embodiment, the network polymer is a gel-forming polymer that under conditions of use is gelled with an anti-pathogenic liquid. Cross-linked polyHEMA, cross-linked carboxymethylcellulose and other cross-linked cellulose ethers (free acid or salt), cast mixtures of poly (vinylpyrrolidone) and poly(sodium styrene sulfonate), cast mixtures of poly(ethylene glycol) and poly (vinylpyrrolidone), cast mixtures of carboxymethyl cellulose and hydroxyethyl cellulose, guar gum, xanthan gum, sodium alginate, and poly(dimethylsiloxane) are examples of gel-forming polymers.

The air filtration medium is fabricated by curing a pre-polymer in the presence of the fibrous substrate. The term "curing" means polymerizing a mixture of a monomer and a cross-linking agent, covalently cross-linking a linear polymer or oligomer and partially desolvating a mixture of linear polymers that form stable ionic or hydrogen bonding interactions between polymer chains. As used herein, the term "pre-polymer" refers to: a mixture of "monomers," small molecules of the same structure that undergo repeated addition to form a polymer and a cross-linking agent; to linear polymers that can be covalently cross-linked; to mixtures of linear polymers that cross-link by ionic or hydrogen bonding interactions; and to oligomers, which may be non-identical that can react to form a cross-linked polymer, like poly (dimethylsiloxane) pre-polymer.

Depending upon the curing conditions and the substrate, the polymer network may be covalently bound to the fibrous substrate, for instance, if the substrate has sites of unsaturation and the network polymer is formed around the fibers by addition polymerization. However, while not intending to be bound by any particular theory, it is believed that the polymer network adheres to a substrate fiber by forming a substantially continuous sheath around the fiber that cannot be separated without cleavage of covalent, ionic or hydrogen bonding interactions within the network.

In the novel process for producing the inventive air filtration media, the fibrous substrate is contacted with and preferably saturated with a solution of pre-polymer in a pre-polymer solvent. Contacting may be practiced by immersing the substrate in the solution, by spraying the solution on the substrate or other means that wets the fibers of the fibrous substrate.

Preferably, the fibrous substrate is immersed in the pre-polymer solution. After immersion, the fibrous substrate is removed from the pre-polymer solution. Excess pre-polymer solution is allowed to drain from the substrate for a period of minutes to hours after wetting, or the fibrous substrate is blotted with an absorbent material to remove excess pre-polymer solution. The remaining pre-polymer on the surface of the fibers is then cured under appropriate conditions for the particular polymer sought to be produced.

When curing involves heating, the curing temperature should not be so high as to decompose the reactants. The time required for curing will depend on the curing temperature or, if cured by irradiation, then on the intensity of the irradiation. Therefore, the curing time can vary greatly.

Generally, the solvent for the pre-polymer solution may be water or any organic solvent. Preferred solvents are water, glycerol, poly(ethylene glycol) and silicone oil, with mixtures of water and glycerol being especially preferred.

In addition to pre-polymer, the pre-polymer solution will contain a cross-linking agent, unless the pre-polymer is bi- or multi-functional so that it can cross-link without a separate agent. Those skilled in the art of polymer chemistry recognize that many crosslinking agents exist and that their selection depends upon the functional groups or reactive intermediates on the polymer with which they are intended to react. Examples of cross-linking agents are provided below in descriptions of preferred processes for forming the network polymer.

The pre-polymer solution also may contain viscosity modifiers. A viscosity modifier may be used to control the amount of solution that remains on the substrate after draining or blotting which, in turn, affects the thickness of the coating. An especially preferred solvent system is about two parts water and one part glycerol, whose viscosity is such that it may be used advantageously without a separate viscosity modifier. The selection and use of viscosity modifiers is well known in the art.

In addition to the above-described components of the solution, the solution may further contain any additives that do not inhibit the curing, such as surfactants and other substances added to improve the solubility of the other components in the solvent.

This description turns now to the means whereby antimicrobial properties are imparted to the air filtration medium. In embodiments that possess an anti-pathogenic polymer network, chemical functionality on the polymer network establishes chemical conditions that are destructive to pathogens that come in contact with the air filtration medium. Such functionality may be acidic, basic, oxidizing or have detergent properties that disrupt the cell membrane of pathogens.

Non-limiting examples of coating polymers that have anti-pathogenic chemical functionality are poly(4-styrenesulfonic acid), poly(acrylic acid), poly(methacrylic acid), poly(4-vinyl pyridine) quaternary ammonium salts and polyethylenimine quaternary ammonium salts and poly(vinylpyrrolidone) iodine complexes, all of which can be formed on the substrate fibers as a randomly cross-linked polymer.

Randomly cross-linked polymers can be formed by polymerizing mixtures of a monomer and a bi- or multi-functional cross-linking agent. Exemplary cross-linking agents include divinylbenzene (DVB), which is preferred for use with poly(styrenesulfonic acid) monomer and its salts. Additional exemplary cross-linking agents that are preferred for use with acrylic acid and methacrylic acid monomer are 1,4-butane diol diacrylate, triethanolamine dimethacrylate, triethanolamine trimethacrylate, tris(methacryloyloxymethyl) propane, allyl methacrylate, tartaric acid dimethacrylate, N,N'-methylene-bisacrylamide, hexamethylene bis(methacryloyloxyethylene) carbamate, 2-hydroxytrimethylene dimethacrylate and 2,3-dihydroxytetramethylene dimethacrylate, 1,3-butanediol diacrylate, di(trimethylolpropane) tetraacralate, poly(ethylene glycol) diacrylate, trimethylolpropane ethoxylate, poly(propylene glycol) dimethacrylate, bisphenol A dimethacrylate and 1,4-butandiol acrylate, with 1,4-butanediol acrylate being especially preferred. Additional exemplary cross-linking agents that are preferred for use with amine functionalized monomers are diepoxides, blocked isocyanates and epichlorhydrin.

The formation of a anti-pathogenic polymer network of a randomly cross-linked polymer is further illustrated with poly(styrene sulfonic acid). A anti-pathogenic coating of cross-linked poly(4-styrenesulfonic acid) may be applied by free radical addition polymerization of 4-styrenesulfonic acid monomer and a cross-linking agent. The polymerization may be initiated with UV irradiation (with or without a chemical initiator) or with thermal initiation with a chemical initiator. Conventional chemical initiators may be employed, such as azo compounds, like 2,2'-azoisobutynitrile ("AIBN"), 1,1'-azobis(cyclohexanecarbonitrile), and 4,4'-azobis(4-cyanovaleric acid); peroxides, like di-t-butyl peroxide, lauroyl peroxide, benzoyl peroxide, isobutyl peroxy octoate, t-butyl peroctoate, n-butyl-4-4'-bis(t-butylperoxy) valerate, Percadox® and the like; and inorganic peroxides such as ammonium persulfate, potassium persulfate, sodium persulfate, and hydroxymethanesulfinic acid, with potassium persulfate being especially preferred.

The concentration of 4-styrenesulfonic acid in the solution is preferably from about 1 wt. % to about 25 wt. %, more preferably about 5 wt. %. The divinylbenzene is preferably present in an amount of from about 0.05 mole % to about 15 mole % with respect to 4-styrenesulfonic acid, more preferably from about 1 mole % to about 5 mole %. A preferred solvent is a mixture of water and glycerol, preferably in a ratio of about 2 to 1. This solvent mixture appears to have an optimal viscosity for producing a 4-styrenesulfonic acid coating. The pH of a pre-polymer solution of 4-styrenesulfonic acid should be below 3, preferably to below 2, and most preferably to below 1. An emulsifying agent, like sodium dodecyl sulfate, also may be added in an amount to dissolve the cross-linking agent. The solution need not be highly concentrated, however. As shown in Example 1, solutions of about 5 wt % 4-styrenesulfonic acid yield a sufficient density of acid functionality to impart an anti-pathogenic property to the air filtration medium.

The fibrous substrate is wetted with the pre-polymer solution and optionally partially dried. Thereafter, the substrate is heated and/or irradiated with a UV lamp to initiate polymerization. When thermal initiation at 85° C. with AIBN is used, the air filtration medium is sufficiently cured in a few hours.

As an alternative to the foregoing procedure for forming a polymer network of 4-styrene sulfonic acid over the substrate fibers, the polymer network can be formed by polymerizing styrene and divinylbenzene to form a polymer network of cross-linked polystyrene and then the polymer network can be sulfonated, for example, by treating the coated fibrous substrate with sulfur trioxide.

An anti-pathogenic air filtration medium having other anti-pathogenic functional groups on the network polymer can be fabricated using a similar procedure. For instance, and as further illustrated in Example 3, 4-vinyl pyridine is polymerized with a bis(vinylic) cross-linking agent according to the above-described procedure. The resulting cross-linked poly(vinyl pyridine) is then converted to a poly(vinyl pyridine) quaternary ammonium salt. The poly(vinyl pyridine) quaternary ammonium salt can be formed by immersing the coated fibrous substrate in a solution of an alkyl bromide, preferably a $C_4$–$C_{24}$ alkyl bromide, more preferably a $C_6$–$C_{12}$ alkyl bromide like lauryl bromide, which is especially preferred. The alkyl bromide converts the pyridine groups into pyridinium bromide salts that are toxic to microorganisms.

An alternative process for forming a poly(4-vinyl pyridine) quaternary ammonium salt polymer network is polymerization of a 4-vinyl pyridine quaternary ammonium salt, which avoids contacting the coated fibrous substrate with a solution of alkyl bromide.

A polymer network of polyethylenimine can be produced from commercially available oligomeric pre-polymer. BASF markets low molecular weight branched polyethylenimine suitable for use as pre-polymer under the brand names Lupasol® and Lugalvan®. If necessary, the pH of the pre-polymer solution should be adjusted to above 10, preferably to above 11, and most preferably to above 12, by adding a suitable strong base such as sodium hydroxide to either solution before the substrate is contacted with the basic layer. When starting with an ethylenimine oligomer, preferred cross-linking agents are epichlorohydrin, diepoxides such as bisphenol A diglycidyl ether. Other preferred crosslinking agents are epoxy resins, especially solid epoxy resins having an epoxy equivalent weight of between 400 and 3000, preferably from 600 to 2000, and most preferably from 500 to 1000. Yet other preferred cross-linking agents are anhydrides such as 4,4'-oxydiphthalic anhydride.

In an alternative embodiment of the air filtration medium of the invention, the network polymer is a gel-forming polymer that under conditions of use is gelled with an anti-pathogenic liquid. Suitable gel-forming polymers include starch, cellulose, guar gum, xanthan gum, alginic acid and other polysaccharides and gums and derivatives thereof such as methyl cellulose, hydroxyethyl cellulose, hydroxypropyl cellulose, methyl-2-hydroxyethyl cellulose, hydroxypropylmethyl cellulose ("HPMC") and carboxymethyl cellulose, poly(vinylpyrrolidone), poly(hydroxyethyl methacrylate) and polyethylene glycol methacrylates having anywhere from two to about twelve ethoxy repeat units and mixtures of poly(vinylpyrrolidone) and poly(sodium styrene sulfonate), mixtures of poly(ethylene glycol) and poly(vinylpyrrolidone), and mixtures of carboxymethyl cellulose and hydroxyethyl cellulose.

Coatings of poly(vinylpyrrolidone) and hydrophilic methacrylate polymers can be applied by free radical addition polymerization in the presence of a difunctional or multifunctional cross-linking agent such as those previously described with reference to polymerization of 4-styrenesulfonic acid. Especially preferred cross-linking agents are bis-methacrylates and bis-methacrylamides such as triethanolamine dimethacrylate, triethanolamine trimethacrylate, tris(methacryloyloxymethyl) propane, tartaric acid dimethacrylate, N,N'-methylene-bisacrylamide, hexamethylene, bis(methacryloyloxyethylene) carbamate, 2-hydroxytrimethylene dimethacrylate and 2,3-dihydroxytetramethylene dimethacrylate.

Coatings of some gel-forming polymers may be applied by casting a solution or dispersion of the polymer onto the fibrous substrate. Pre-polymers that can be cast to form a polymer network around the fibers include starch, cellulose, guar gum, xanthan gum alginic acid and other polysaccharides and gums and derivatives thereof such as methyl cellulose, hydroxyethyl cellulose, hydroxypropyl cellulose, methyl-2-hydroxyethyl cellulose, hydroxypropylmethyl cellulose ("HPMC") and carboxymethyl cellulose, mixtures of poly(vinylpyrrolidone) and poly(sodium styrene sulfonate), mixtures of poly(ethylene glycol) and poly(vinylpyrrolidone).

A gel-forming polymer network can be cast from these pre-polymers by dissolving the pre-polymer in a mixture of a volatile solvent, like water or lower alcohol, and a non-volatile solvent, like glycerol, poly(dimethylsiloxane), polyethylene glycol and polypropylene glycol. The fibrous substrate is immersed in the solution to coat the fibers and then dried to remove the volatile solvent. The polymer coat remains on the fibers and the non-volatile solvent component plasticizes the polymer.

Coatings of gel-forming polymers also can be applied by cross-linking linear polysaccharide polymers in the presence of the fibrous substrate. For example, HPMC can be cross-linked to form a polymer network around the substrate fibers a follows. Linear HPMC pre-polymer, available from under the trade name Methocel® from DuPont, is dissolved in water along with a blocked isocyanate. The fibrous substrate is wetted with the solution, e.g. by immersing and removing from the solution and blotting to remove excess solution, then heated at 85° C. for two hours to dry and cross-link the polymer. Then, the fibrous substrate is immersed in a solution of sodium hydroxide in water to provide a basic anti-pathogenic environment. Another process for cross-linking a linear polysaccharide polymer, carboxymethyl cellulose, is described below.

Polydimethylsiloxane (PDMS) pre-polymer mixtures containing dimethylsiloxane oligomers derivatized for cross-linking and a catalyst are commercially available from Dow Corning Co. under the tradename Dow Corning Resins®, Silastic® and Sylgard®. A silicone polymer coating can be formed on a fibrous substrate by modifying well known procedures in the art for curing silicone pre-polymer into silicone polymer gel. The fibrous substrate is wetted with the pre-polymer mixture and then cured by exposing the wetted substrate to conditions known in the art for curing silicone polymers.

The anti-pathogenic liquid can be either a solution, colloidal suspension or dispersion of any anti-pathogenic substance. Examples of anti-pathogenic liquids that may be retained in the gel-forming polymer network are solutions of acids, bases and oxidizing agents; metal colloidal suspensions, surfactant laden oils and solutions of antimicrobial drugs.

A volatile component of the anti-pathogenic liquid, such as water, will evaporate when the gel coating is exposed to a steady stream of air in a HVAC system. By using a much less volatile diluent, such as glycerol, the gel-forming polymer will remain swollen. Glycerol is a preferred diluent. It is hygroscopic as well as non-volatile, and, as such, will tend to pick up moisture from the air helping to retain the gel-forming polymer in swollen condition. Other non-volatile diluents suitable for this purpose are oils, poly (dimethylsiloxane), polyethylene glycol and polypropylene glycol.

Acids, bases and oxidants (like bleach or organic peroxides) can be immobilized on the air filtration medium by contacting the fibrous substrate coated with a gel-forming polymer network with a solution of the active agent and a non-volatile diluent.

For an acidic environment, the active solution can be prepared with strong mineral acids such as sulfuric acid, hydrochloric acid, nitric acid, or phosphoric acid.

For a basic environment, the active solution can be prepared with strong bases such as sodium hydroxide, potassium hydroxide, lithium hydroxide, or calcium hydroxide, preferably sodium hydroxide.

The active solution also can be prepared with oxidants such as sodium hypochlorite, calcium hypochlorite, magnesium hypochlorite, iodine, PVP-iodine potassium permanganate, trichlorocyanuric acid and sodium dichlorocyanuric acid, hydrogen peroxide and organic peroxides, such as di-t-butyl peroxide. A preferred oxidant is calcium hypochlorite.

The active solution also can be a surfactant-laden oil. When pathogens contact the surface of the substrate, they strongly adhere to the surface and the surfactant molecules encapsulate and eliminate the adsorbed pathogen. Preferred polymers for use in conjunction with surfactant-laden oils are poly(methyl methacrylate) and cross-linked cellulose ethers. Suitable surfactants include non-ionic surfactants, for example Triton® and Tween®. Suitable oils include vegetable oils such as soy bean oil, corn oil and sunflower oil.

A coating of poly(methyl methacrylate) can be formed around the substrate fibers by free radical addition polymerization of methyl methacrylate in the presence of a cross-linking agent such as those previously described as being preferred for polymerization of acrylic acid.

A fibrous substrate having a coating of cross-linked cellulose ether may be fabricated as follows. A pre-polymer solution is prepared from hydroxymethyl cellulose, which is commercially available under the trade name Natrosol® from Hercules Chemical Co., and a cross-linking agent. Preferred cross-linking agents are melamine formaldehyde resins, urea formaldehyde resins, such as Kymene® available from Hercules Chemical Co. and dimethylolurea. An especially preferred cross-linking agent is Kymene® 917 in combination with an ammonium chloride catalyst (10 wt. % with respect to Kymene®). The fibrous substrate is immersed in and removed from, or sprayed with, the pre-polymer solution. The fibrous substrate is then dried and cured at 80° C. for two hours. The resulting fibrous substrate having a coating of gel-forming polymer may subsequently be contacted with a surfactant laden oil to produce an anti-pathogenic air filtration medium. Alternatively, the oil and surfactant can be added to the pre-polymer solution.

The anti-pathogenic filter with a coating of gel-forming polymer is further illustrated with a metal colloid suspension. Certain metal colloidal suspensions, specifically silver and copper and more particularly silver, have demonstrated anti-pathogenic activity against a broad spectrum of bacterial species. Metal colloids with anti-pathogenic activity, preferably silver and copper, most preferably silver, can be incorporated into the filter in one step by including them in the pre-polymer solution before contacting with the fibrous substrate and curing. Alternatively, a coating of gel forming polymer can be formed prior to contacting the air filtration medium with the metal colloid. In this two-step process, the coating preferably is desolvated such as by heating before contacting with the metal colloid. Then the fibrous substrate with a desolvated coating will take up the colloid upon contact.

The metal colloids may be incorporated into the pre-polymer solution by a variety of methods. In one method, the metal colloids are prepared and then added to the pre-polymer solution. The metal colloids may be prepared by reduction of metal salts via chemical, electrochemical or irradiative processes, which are known to those of skill in the art. For example, silver salts may be reduced to metallic silver with sodium borohydride (chemical), an electric potential (electrochemical) or with visible light (irradiative). Metal colloids are typically made up of particles with a mean diameter between 10 and 500 nanometers. Passivating agents may be added to the reducing medium to control particle size and coat the particle surface to minimize particle aggregation. Common passivating agents include bovine serum albumin, casein, and bovine milk proteins (e.g. powdered milk). Preferably, the passivating agents contain functional groups that react with the components of the pre-polymer solution. More preferably, the passivating agents are physically entrained within the colloidal particle to facilitate entrapment of the colloidal particle within the coating.

The general procedure previously described by which a coating of gel-forming polymer can be formed on a fibrous substrate can be used to concurrently coat the substrate with the gel-forming polymer and entrain a metal colloid suspension in the coating. A pre-polymer solution of carboxymethyl cellulose and polyacrylic acid is prepared, optionally with a wetting agent, like WetAid NRW®. A preferred pre-polymer solution contains from about 2 to about 6 wt. %, more preferably about 4 wt. % carboxymethyl cellulose; from about 2 to about 10 wt. %, more preferably about 5 wt. % poly(acrylic acid) having a molecular weight of from about 100,000–125,000 a.u.; and from about 0.05 to about 0.5 wt. % wetting agent in an approximately 2:1 mixture of water and glycerol. In addition, from about 3 to about 10 wt. %, more preferably about 6 wt. % of metal colloid is added to the pre-polymer solution. Optionally a passivating agent like Kathon CG-ICP® can be added preliminarily to the metal colloid to help disperse the metal particles. After thorough mixing and a uniform dispersion is obtained, the fibrous substrate is immersed in the dispersion. After removal, the treated substrate is dried and cured according to the general procedure.

The metal colloids also may be prepared directly within the pre-polymer solution. A soluble metal salt of silver or copper is mixed with between one and all components of the pre-polymer solution and then exposed to reductive conditions that induce colloid formation. This approach offers a potential advantage in that a viscous solution of between one and all components of the pre-polymer solution can prevent aggregation of the nascent colloidal particles. Furthermore, one or more of the components of the pre-polymer solution may function as a passivating agent for the colloid particles.

The gel-coated embodiments of this invention possess the advantage that fibrous substrates, which are less efficient and costly than HEPA substrates can attain collection efficiencies comparable to those of HEPA filters through pore size reduction, reduction of particle bounce and increase in particle impingement. When contaminated air moves through the pores of the air filtration medium, pathogens encounter the surfaces of the substrates supporting the active layer via collision or diffusion. The proportion of pathogens impinging on the air filter that are retained is expressed as the filter's collection efficiency. A filter's collection efficiency depends on the pore size and thickness of the air filtration medium and the size of the pathogen. Anti-pathogenic filters having a gel-forming polymer network coating will tend to increase the collection efficiency of the fibrous substrate to which it is adhered by two distinct mechanisms. First, a gel coating will increase the thickness of the fibers and concomitantly reduce the pore size. The extent of pore size reduction is controlled by the amount of polymer, degree of cross-linking and choice of solvent in the pre-polymer solution. Second, the gel coatings are generally more adherent to small particles than the surfaces of fibrous substrates conventionally used to make air filters. The effect of coatings of anti-pathogenic polymer networks on a substrate's collection efficiency will vary depending upon the choice of pre-polymer and the pre-polymer solution solvent system. The pre-polymer solvent system affects the collection efficiency of the filter because its viscosity affects the amount of pre-polymer that adheres to the filter after removal of the fibrous substrate from the pre-polymer solution or spraying.

The anti-pathogenic effectiveness of an air filter relates to the death rate of pathogens that become entrained on the air filter. The anti-pathogenic effectiveness of a filter depends on the susceptibility of a particular pathogen to the anti-pathogenic component of the coating and the loading level. One of the benefits of this invention is that the active agent is uniformly dispersed on the filter.

The anti-pathogenic agent may inhibit propagation of the pathogen without killing it a low loading levels. Although, the invention contemplates air filtration media, air filters and filter cartridges that are effective at inhibiting the propagation of pathogenic microorganisms, air filters and filter cartridges made in accordance with this invention preferably cause the death of 75% or more of the pathogens to which it is directed, e.g. those sensitive to acidic, basic or oxidizing conditions, after 24 hours of capture on the filter.

Protection from a broad spectrum of airborne pathogens is afforded by using a combination of filter media each having a different anti-pathogenic environment. Mechanisms for multiple microorganism capture and elimination can be implemented simultaneously in a compact assembly. A plurality of air filtration media made in accordance with this invention, each exploiting a different anti-pathogenic mechanism, can be stacked in a single device such as a filter for an HVAC system or replaceable cartridge for a gas mask. In addition, anti-pathogenic air filters of this invention can be used in tandem with conventional air filters. Air filters of this invention can be positioned either upstream so as to function as a pre-filter for the conventional filter or they can be downstream of the conventional filter, which then would serve as a pre-filter for the anti-pathogenic filter. Accordingly, the present invention also provides devices comprising one or more layers of air filtration media in stacked arrangement.

The application of a gel-forming polymer layer to the fibers of an air filter offers the opportunity to retain auxiliary substances that do not physi- or chemi-sorb on the filtration medium such as flame-retardant chemicals, odor-absorbing compounds and chemical neutralizers. In this way, the gel-forming polymer coating acts as a binder for these substances.

In addition to its anti-pathogenic activity, the coatings of some embodiments will neutralize certain toxic gases without having to add separate chemical neutralizers. Basic, acid and oxidizing coatings made in accordance with the invention deactivate some chemical agents. For instance, a gel-forming polymer network treated with a solution of base will neutralize acid gases like cyanide, hydrogen chloride, phosgene and hydrogen sulfide. Further, chemical absorbents, like activated carbon, can be incorporated into the coating to augment the coating with activity against chemical agents as further illustrated in Example 6. The reactivity of other active agents in gel coatings and of anti-pathogenic polymers toward other toxic gases will be readily apparent to those skilled in the art of handling and disposing of toxic chemicals.

Although this invention has been described with respect to certain specific embodiments, it will be appreciated by those skilled in the art that various modifications may be made without departing from the spirit and scope of the invention. The present invention is further illustrated by the following examples.

EXAMPLES

Example 1

Coating of a Fibrous Substrate with an Acidic Polymer

An aqueous solution is made of the following: 30 wt. % glycerol, 5 wt. % styrene sulfonic acid, 0.1 wt. % divinylbenzene, 0.13 wt. % 2,2'-azobisisobutyronitrile, 0.02 wt. % potassium persulfate, and 0.5 wt. % sodium dodecyl sulfate. A fiberglass pad is dipped in the above solution, padded dry, and then cured at 85° C. for 2 h.

Example 2

Coating a Fibrous Substrate with a Surfactant Laden Emulsion

An aqueous solution is made of the following: 30 wt. % glycerol, 5 wt. % methyl methacrylate, 0.1 wt. % 1,4- butanediol diacrylate, 0.13 wt. % 2,2'-azobisisobutyronitrile, 0.02 wt. % potassium persulfate, and 1 wt. % Triton X-100, and 10 wt. % soy bean oil. A non-woven polyethylene pad is dipped in the above solution, padded dry, and then cured at 85° C. for 2 h.

Example 3

Coating of Fibrous Substrate with a Basic Polymer and Derivatization to Form an Anti-pathogenic Quaternized Amine Gel Coating An aqueous solution is made of the following: 30 wt. % glycerol, 5 wt. % vinyl pyridine, 0.25 wt. % divinylbenzene, 0.13 wt. % 2,2'-azobisisobutyronitrile, 0.02 wt. % potassium persulfate, and 0.5 wt. % sodium dodecyl sulfate. A polyester pad was dipped in the above solution, padded dry, and then cured at 85° C. for 2 h. The pad is then dipped in an aqueous solution of lauryl bromide.

Example 4

Coating a Fibrous Substrate with a Basic Gel Layer

An aqueous solution containing 30 wt. % glycerol, 5 wt. % polyethylenimine and 0.25 wt. % glycerol propoxylate triglycidyl ether. A polyester pad is immersed in the solution, blotted dry and cured at 100° C. for 6 hours. The polyester pad is then immersed in an aqueous sodium hydroxide solution of pH 12 or greater containing 30 wt. % glycerol, removed from the solution, blotted dry and dried at 50° C. for two hours.

Example 5

Concurrent Formation of a Gel-Forming Polymer Coating over the Fibrous Substrate and Entrainment of Metal Colloid in the Coating An aqueous solution is prepared using 4 wt. % carboxymethyl cellulose (Aqualon 7L2; Aqualon, subsidiary of Hercules Chemical Co.), 5 wt. % poly(acrylic acid) (MW=100,000–125,000; Polacryl), 0.1 wt. % WetAid NRW wetting agent (BFGoodrich, Charlotte, N.C.), 0.05 wt. % Kathon CG-ICP preservative (Rohm and Haas, La Porte, Tex.), and 6 wt. % colloidal silver particles. A polyester pad is immersed in solution, blotted and dried at 195° F. for 5 minutes and cured at 335° F. for thirty seconds.

Example 6

Concurrent Formation of a Gel-Forming Polymer Coating over the Fibrous Substrate and Entrainment of Activated Carbon in the Coating A formulation similar to Example 5 is prepared, substituting activated carbon powder (8% by weight) in place of the metal colloid. The carbon, having a particle size of approximately 40 µm, is available from Fluka Chemical (Milwaukee, Wis.). A polyester pad is dipped into each solution, padded and dried at 195° F. for 5 minutes and cured at 335° F. for thirty seconds.

Example 7

Formation of an Oxidizing Gel Coating

An aqueous solution is made of the following: 20 wt. % tetraethoxysilane, 20 wt. % bis(triethoxysilyl)methane, 10 wt. % glycerol, and 0.05 wt. % citric acid. A fiber glass pad is dipped in the above solution, blotted, and then cured by steam heating for 6 h. The pad is then dipped in an aqueous solution of 2% sodium hypochlorite and 0.5% cyanuric acid.

What is claimed is:

1. An anti-pathogenic air filtration medium comprising:
   a) a fibrous substrate comprising a plurality of intermingled fibers and
   b) surrounding each of a substantial proportion of the plurality of fibers, an anti-pathogenic coating comprising an anti-pathogenic polymer network selected from the group consisting of cross-linked poly(styrenesulfonic acid) (free acid or salt), cross-linked polyacrylic acid (free acid or salt), cross-linked poly(methacrylic acid), cross-linked poly(vinyl pyridine) quaternary ammonium salts and cross-linked polyethylenimine quaternary ammonium salts and co-polymers thereof.

2. The anti-pathogenic air filtration medium of claim 1 wherein the polymer network can withstand acidic, basic, oxidizing or strongly solubilizing substances.

3. An anti-pathogenic air filtration medium comprising:
   a) a fibrous substrate comprising a plurality of intermingled fibers and
   b) surrounding each of a substantial proportion of the plurality of fibers, an anti-pathogenic coating comprising an anti-pathogenic polymer network selected from the group consisting of cross-linked poly(styrenesulfonic acid) (free acid or salt), cross-linked polyacrylic acid (free acid or salt), cross-linked poly(methacrylic acid), cross-linked poly(vinyl pyridine) quaternary ammonium salts and cross-linked polyethylenimine quaternary ammonium salts and co-polymers thereof, wherein the polymer network is a randomly cross-linked polymer.

4. The air filtration medium of claim 1 wherein the polymer network bears acidic functionality.

5. An anti-pathogenic air filtration medium comprising:
   a) a fibrous substrate comprising a plurality of intermingled fibers and
   b) surrounding each of a substantial proportion of the plurality of fibers, an anti-pathogenic coating comprising an anti-pathogenic polymer network selected from the group consisting of cross-linked poly(styrenesulfonic acid) (free acid or salt), cross-linked polyacrylic acid (free acid or salt), cross-linked poly(methacrylic acid), cross-linked poly(vinyl pyridine) quaternary ammonium salts and cross-linked polyethylenimine quaternary ammonium salts and co-polymers thereof, wherein the polymer network is cross-linked 4-styrenesulfonic acid.

6. The air filtration medium of claim 5 wherein the polymer network is 4-styrenesulfonic acid cross-linked with divinylbenzene.

7. An anti-pathogenic air filtration medium comprising:
   a) a fibrous substrate comprising a plurality of intermingled fibers and
   b) surrounding each of a substantial proportion of the plurality of fibers, an anti-pathogenic coating comprising an anti-pathogenic polymer network selected from the group consisting of cross-linked poly(styrenesulfonic acid) (free acid or salt), cross-linked polyacrylic acid (free acid or salt), cross-linked poly(methacrylic acid), cross-linked poly(vinyl pyridine)

quaternary ammonium salts and cross-linked polyethylenimine quaternary ammonium salts and co-polymers thereof, wherein the polymer network contains quaternary ammonium functionality.

8. The air filtration medium of claim 7 wherein the polymer network is a cross-linked polyethylenimine quaternary ammonium salt.

9. The air filtration medium of claim 7 wherein the polymer network is a cross-linked poly(vinyl pyridine) quaternary ammonium salt.

10. An anti-pathogenic air filtration medium comprising:
  a) a fibrous substrate comprising a plurality of intermingled fibers and
  b) surrounding each of a substantial proportion of the plurality of fibers, an anti-pathogenic coating comprising a polymer network wherein the polymer network is a gel-forming polymer and the coating further comprises a non-volatile anti-pathogenic liquid.

11. The anti-pathogenic air filtration medium of claim 10 wherein the gel-forming polymer is selected from the group consisting of covalently cross-linked linear polymers and linear polymers cross-linked by ionic or hydrogen bonding interactions.

12. The anti-pathogenic air filtration medium of claim 11 wherein the gel-forming polymer is selected from the group consisting of polysaccharides, polysaccharide derivatives, poly(vinylpyrrolidone), poly(hydroxyethyl methacrylate), polyethylene glycol methacrylates having anywhere from two to about twelve ethoxy repeat units, mixtures of poly(vinylpyrrolidone) and poly(sodium styrene sulfonate), mixtures of poly(ethylene glycol) and poly(vinylpyrrolidone) and mixtures of carboxymethyl cellulose and hydroxyethyl cellulose.

13. The anti-pathogenic air filtration medium of claim 12 wherein the polysaccharide derivative is selected from the group consisting of methyl cellulose, hydroxyethyl cellulose, hydroxypropyl cellulose, methyl-2-hydroxyethyl cellulose, hydroxypropylmethyl cellulose and carboxymethyl cellulose.

14. The anti-pathogenic air filtration medium of claim 11 wherein the polymer network is a mixture of linear polymers cross-linked by ionic or hydrogen bonding.

15. The anti-pathogenic air filtration medium of claim 14 wherein the polymer network is selected from the group consisting of mixtures of poly(vinylpyrrolidone) and poly(sodium styrene sulfonate), mixtures of poly(ethylene glycol) and poly(vinylpyrrolidone), mixtures of carboxymethyl cellulose and hydroxyethyl cellulose, guar gum, xanthan gum and alginic acid.

16. An anti-pathogenic air filtration medium comprising:
  a) a fibrous substrate comprising a plurality of intermingled fibers and
  b) surrounding each of a substantial proportion of the plurality of fibers, an anti-pathogenic coating comprising a polymer network wherein the polymer network is a covalently cross-linked linear polymer.

17. The air filtration medium of claim 16 wherein the linear polymer is hydroxymethyl cellulose.

18. The air filtration medium of claim 17 wherein the hydroxymethyl cellulose is cross-linked with a cross-linking agent selected from the group consisting of melamine formaldehyde resins, urea formaldehyde resins and dimethylolurea.

19. The air filtration medium of claim 18 wherein the cross-linking agent is a urea formaldehyde resin.

20. The air filtration medium of claim 10 wherein the polymer network is randomly cross-linked polymer.

21. The air filtration medium of claim 20 wherein the polymer network is selected from the group consisting of cross-linked poly(hydroxyethylmethacrylate), poly(vinylpyrrolidone) and polyethylene glycol methacrylates.

22. The air filtration medium of claim 10 wherein the anti-pathogenic liquid is selected from the group consisting of solutions of acids, bases and oxidants in non-volatile diluents; metal colloidal suspensions in non-volatile diluents; and surfactant-laden non-volatile oils.

23. The air filtration medium of claim 22 wherein the non-volatile anti-pathogenic liquid is a surfactant laden oil comprising vegetable oil and a non-ionic surfactant.

24. The air filtration medium of claim 22 wherein the non-volatile anti-pathogenic liquid is a metal colloid suspension.

25. A device for filtering air comprising an air filtration medium of any of claims 1, 10 and 16.

26. A device of claim 25 selected from the group consisting of heating, ventilating and air conditioning system filters and gas masks.

27. A device for filtering air comprising a plurality of air filtration media of any of claims 1, 10 and 16.

28. A device of claim 27 selected from the group consisting of heating, ventilating and air conditioning system filters and gas masks.

29. A process for fabricating an anti-pathogenic air filtration medium comprising:
  a) wetting a fibrous substrate comprising a plurality of intermingled fibers with a solution of pre-polymer wherein the pre-polymer is a mixture of 4-styrenesulfonic acid and a cross-linking agent, and
  b) curing the pre-polymer in the solution wetting the fibers to form an anti-pathogenic polymer network about the fibers.

30. The process of claim 29 wherein wetting comprises immersing the fibrous substrate into a bath of the pre-polymer solution and removing the fibrous substrate from the bath.

31. The process of claim 30 wherein wetting further comprises partially drying the fibers by a technique selected from the group consisting of heating the fibrous substrate, allowing the pre-polymer solution to drain from the fibrous substrate, blotting the fibrous substrate with an absorbent material or combination thereof after removing the fibrous substrate from the bath.

32. The process of claim 29 wherein wetting comprises spraying the solution of pre-polymer onto the fibrous substrate.

33. The process of claim 32 wherein wetting further comprises partially drying the fibers using a process selected from the group of processes consisting of heating the fibrous substrate, allowing the pre-polymer solution to drain from the fibrous substrate, blotting the fibrous substrate with and absorbent material or combination thereof.

34. The process of claim 29 wherein the cross-linking agent is divinylbenzene.

35. The process of claim 34 wherein the fibrous substrate is wetted with a solution of styrene sulfonic acid, divinylbenzene and a radical initiator in a mixture of glycerol and water.

36. A process for fabricating an anti-pathogenic air filtration medium comprising:
   a) wetting a fibrous substrate comprising a plurality of intermingled fibers with a solution of pre-polymer, wherein the pre-polymer is a mixture of vinyl pyridine and a cross-linking agents,
   b) curing the pre-polymer in the solution wetting the fibers to form a polymer network about the fibers, and
   p1 c) contacting the fibrous substrate with an alkyl bromide to convert pendant pyridine groups on the polymer network to quaternary ammonium salts to make the polymer network anti-pathogenic.

37. The process of claim 36 wherein the fibrous substrate is contacted with a solution of vinyl pyridine, divinylbenzene and a radical initiator in a mixture of glycerol and water.

38. A process for fabricating an anti-pathogenic air filtration medium comprising:
   a) wetting a fibrous substrate comprising a plurality of intermingled fibers with a solution of pre-polymer, wherein the pre-polymer is a mixture of a quaternary ammonium salt of vinyl pyridine and a cross-linking agent, and
   b) curing the pre-polymer in the solution wetting the fibers to form an anti-pathogenic polymer network about the fibers.

39. A process for fabricating an anti-pathogenic air filtration medium comprising:
   a) wetting a fibrous substrate comprising a plurality of intermingled fibers with a solution of pre-polymer
   b) curing the pre-polymer in the solution wetting the fibers to form a gel-forming polymer network about the fibers; and
   c) contacting the fibrous substrate with an anti-pathogenic liquid of: a solution of an acid, base or oxidant in at least one non-volatile diluent; a metal colloid suspension in at least one non-volatile diluent; or a surfactant-laden non-volatile oil.

40. The process of claim 39 wherein the anti-pathogenic liquid is-of a silver colloid suspension, a copper colloid suspension or a combination thereof.

41. The process of claim 39 wherein the anti-pathogenic liquid is selected from the group consisting of silver colloid suspensions and copper colloid suspensions.

42. The process of claim 39 wherein the pre-polymer solution further comprises a metal colloid and wherein curing the pre-polymer entrains an anti-pathogenically effective amount of metal colloid in the gel-forming polymer.

43. The process of claim 39 wherein the pre-polymer solution further comprises a surfactant and a non-volatile oil.

44. An air filtration medium produced by the process of any of claims 29, 36, 38 and 39.

45. An air filtration medium produced by the process of any of claims 29, 36, 38, and 39.

46. A device comprising the air filtration medium of claim 45.

47. A neutralizing filtration medium for neutralizing a substance in a fluid, comprising:
   a) a fibrous substrate comprising a plurality of intermingled fibers; and
   b) a coating comprising a gel-forming polymer layer and auxiliary substances surrounding each of a substantial proportion of the plurality of intermingled fibers, wherein the auxialiary substances are capable of chemically neutralizing at least one harmful gas, vapor or aerosol.

48. The neutralizing filtration medium of claim 47 wherein the harmful gas, vapor or aerosol is a toxic gas.

49. A neutralizing filtration medium for neutralizing a substance in a fluid, comprising:
   a) a fibrous substrate comprising a plurality of intermingled fibers; and
   b) a coating comprising a gel-forming polymer layer and auxiliary substances surrounding each of a substantial proportion of the plurality of intermingled fibes, wherein the auxiliary substances are capable of chemically neutralizing at least one harmful gas, vapor or aerosol, wherein the auxiliary substances include an oxidizing substance.

50. The neutralizing filtration medium of claim 49 wherein the oxidizing substance is one of a bleach, a hydrogen peroxide, an organic peroxide, a sodium hypochlorite, a calcium hypochlorite, a potassium permanganate, a magnesium-hypochlorite, an iodine, a PVP-iodine, trichlorocyanuric acid, and sodium dichlorocyanuric acid.

51. The neutralizing filtration medium of claim 50 wherein the oxidizing substance is an organic peroxide.

52. The neutralizing filtration medium of claim 51 wherein the oxidizing substance substance is a di-t-butyl peroxide.

53. The neutralizing filtration medium of claim 49 wherein the oxidizing substance is a potassium permanganate.

54. The neutralizing filtration medium of claim 50 wherein the oxidizing substance is an iodine.

55. The neutralizing filtration medium of claim 49 wherein the auxiliary substances include an acidic substance.

56. The neutralizing filtration medium of claim 49 wherein the auxiliary substances include a basic substance.

57. The neutralizing filtration medium of claim 49 wherein the oxidizing substance is a bleach.

* * * * *